(12) United States Patent  
Labrecque et al.

(10) Patent No.: US 6,793,630 B2
(45) Date of Patent: Sep. 21, 2004

(54) METHOD AND SYSTEM FOR DETECTING ESTRUS IN SWINE

(75) Inventors: Robert Labrecque; Germain Labrecque, both of St-Bernard (CA)

(73) Assignee: Conception Ro-Main Inc., St-Bernard (CA)

(*) Notice: Subject to any disclaimer, the term of this patent is extended or adjusted under 35 U.S.C. 154(b) by 33 days.

(21) Appl. No.: 09/745,845

(22) Filed: Dec. 26, 2000

(65) Prior Publication Data

US 2001/0027276 A1 Oct. 4, 2001

Related U.S. Application Data

(63) Continuation-in-part of application No. 09/299,964, filed on Apr. 26, 1999, now Pat. No. 6,196,975.

(30) Foreign Application Priority Data

Feb. 25, 1999 (GB) ............................................. 9904199

(51) Int. Cl.[7] ................................................. A61B 5/00
(52) U.S. Cl. ...................... 600/551; 119/453; 119/455; 119/472
(58) Field of Search ................................. 600/551, 591; 119/416, 452, 453, 455, 472–474, 727

(56) References Cited

U.S. PATENT DOCUMENTS

| 4,140,080 A | * | 2/1979 | Snader ........................ 119/473 |
| 5,671,697 A | * | 9/1997 | Rutman ....................... 119/473 |
| 6,196,975 B1 | * | 3/2001 | Labrecque et al. .......... 600/551 |

* cited by examiner

Primary Examiner—Max Hindenburg
(74) Attorney, Agent, or Firm—Michel Sofia; Ogilvy Renault

(57) ABSTRACT

There is provided a moveable cart for use in transporting an animal, as a male hog, past one or more rows of cages containing sows to permit the determination of estrus in the sows and also to increase the success rate during artificial insemination by permitting snout to snout contact between the sow and male hog, the cart having a base with wheels mounted thereon, at least one wall extending upwardly from the base, and at least one panel for blocking visual access in at least one direction between the interior and exterior of the cart and at least one opening in the wall sized to permit the head of an animal to least partially extend therethrough.

34 Claims, 18 Drawing Sheets

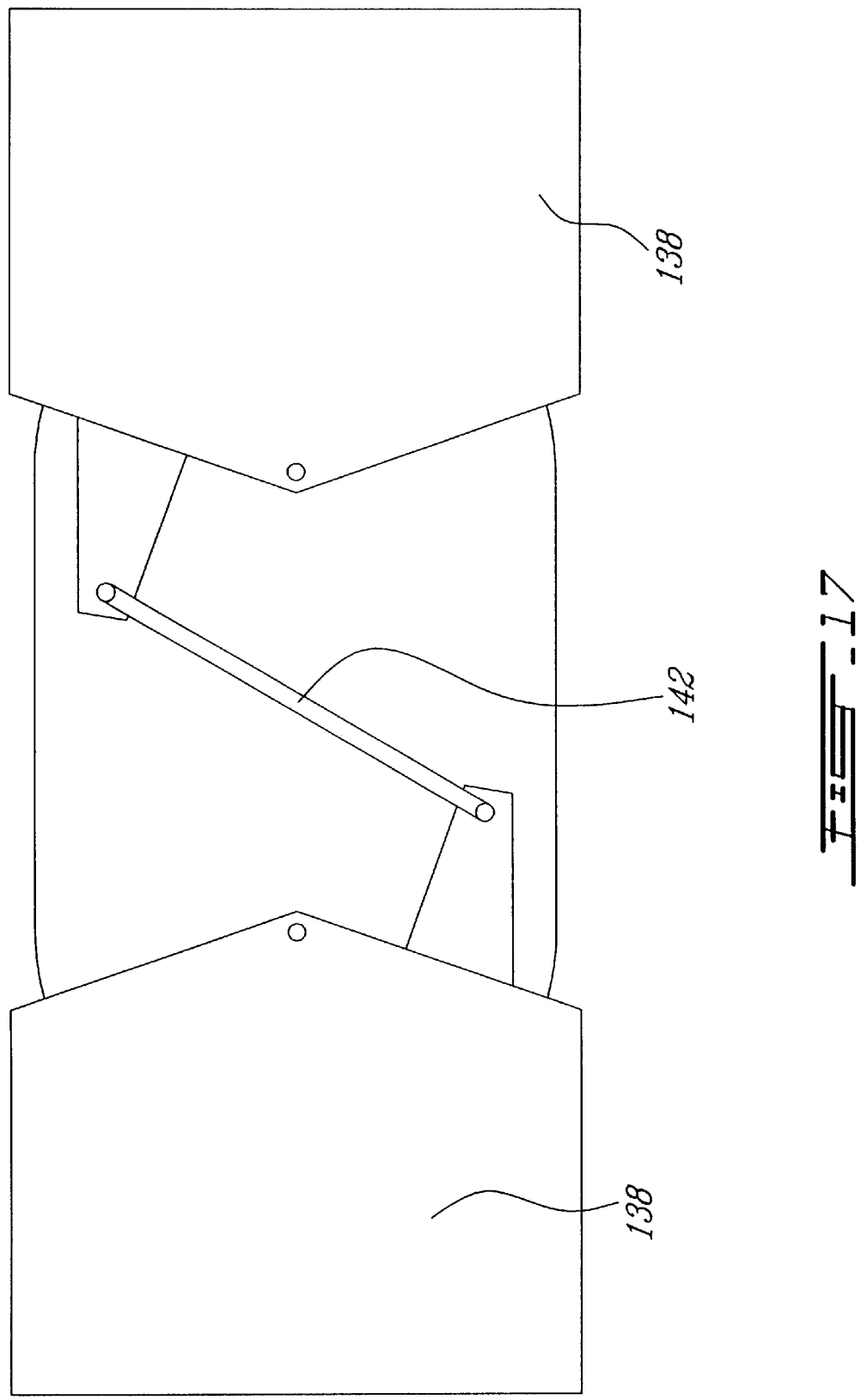

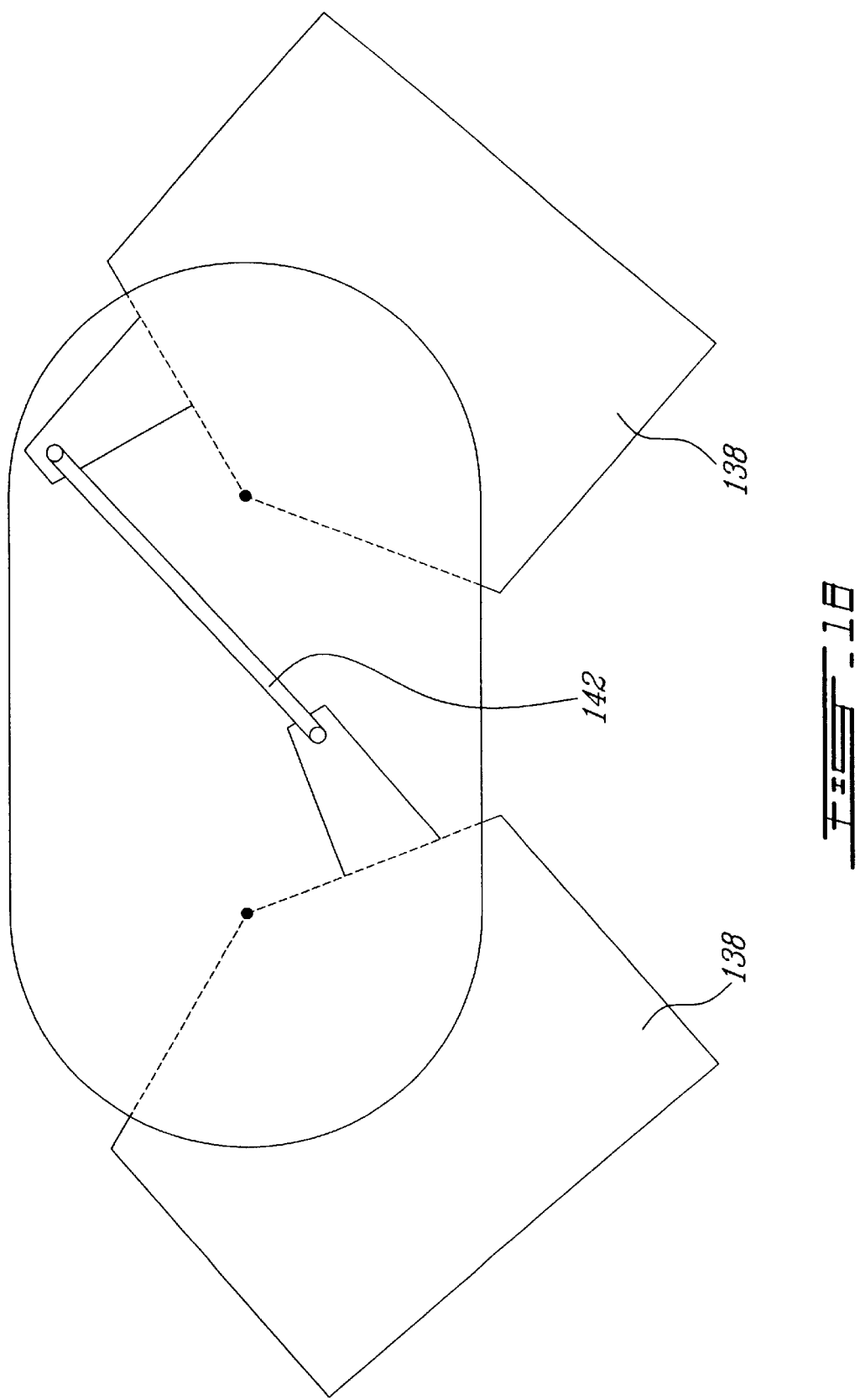

METHOD AND SYSTEM FOR DETECTING ESTRUS IN SWINE

CROSS-REFERENCE

This application is a continuation-in-part of U.S. Ser. No. 09/299,964 filed on Apr. 26, 1999, now U.S. Pat. No. 6,196,975 which issued on Mar. 6, 2001.

BACKGROUND OF THE INVENTION

1. Field of the Invention

The present invention relates to the field of animal husbandry and in particular, relates to a moveable cart suitable for use in a hog rearing operation and to improvements in such operations and methods associated therewith.

2. Description of the Prior Art

In hog rearing operations, it has become essential to maximize the reproductive capacity of the sows. Originally, many hog raising operations simply relied on letting nature take its course with impregnation of the sow by the male hog. However, with larger operations, it became necessary to increase the reliability and accordingly, artificial insemination has been widely practiced.

In order for artificial insemination to work efficiently and economically, it is necessary to administer the semen at the time when estrus is occurring. Typically, semen is administered between 1 and 4 times during estrus in predetermined spaced apart time intervals.

It has been proposed in the art to use instrumentation to attempt to determine estrus. Typically, there have been proposed various types of temperature sensors and probes insertable into the vaginal canal for detecting either an increase in temperature or increase in current flow through the mucous. Although these methods do work, they are both time and labour intensive and increase the risk of mortality through contamination, infection, etc.

More traditionally, the technique employed on the modern day farm is to circulate a male hog down a row of cages containing the sows.

Despite all the advances in the art, typically the impregnation success ratio (i.e. the number of sows successfully impregnated) is in the area of between 75% to 85%. While these rates represent a vast improvement over older success rates, it is obviously desirable to further increase the rate.

SUMMARY OF THE INVENTION

It is an object of the present invention to provide a method for the artificial insemination of sows.

It is a further object of the present invention to provide a cart which may be used in a hog rearing operation to assist in determining estrus and improving the success rate of artificial insemination.

In one aspect of the invention, there is provided a cart for the transportation of animals, the animals being selected from the group consisting of porcine, bovine, equine, canine, feline, and ungulates.

In another aspect of the present invention, there is provided a cart suitable for animal transportation, the cart comprising a base, the base having wheels mounted thereon, at least one wall extending upwardly from the base, means associated with the at least one wall for blocking visual access in at least one direction between the interior and exterior of the cart at least one opening in the at least one wall sized to permit a snout of a hog to at least partially extend therethrough, and hog positioning means within the cart to prevent a hog from lying down in the cart.

In a further aspect of the present invention, there is provided a cart suitable for animal transportation, the cart comprising at least two sections, a first end cart section and a second end cart section, the first cart end section including a first base section, a first cart section wall extending upwardly from the first base section to define a first enclosure having an open end, the second end cart section having a second base section, a second cart section wall extending upwardly from the second base section to define a second enclosure having one open side, means for securing the first end cart section and the second end cart section together such that open sides are in alignment and the first end cart section and the second end cart section together define an enclosed cart.

In a particular aspect of the invention, there is provided means associated with one of the cart section walls for blocking visual access in at least one direction between the interior and exterior of the cart, and at least one opening in at least one of the section walls sized to permit a head of an animal to at least partially extend therethrough.

In a further aspect of the present invention, in a hog farming operation having a plurality of sows, each sow being enclosed in an individual cage in a building, the cages being aligned and wherein the heads of all sow are aligned at one end of the cages, the improvement comprising a moveable cart having a base, the base having wheels mounted thereon, at least one wall extending upwardly from the base, which may further include means associated with the at least one wall for blocking visual access in at least one direction between the interior and exterior of the cart, at least one opening in the at least one wall sized to permit a snout of a hog to at least partially extend therethrough, and drive means for driving the cart.

In a further aspect of the present invention, in a process of determining estrus in sow, each sow being enclosed in one of an aligned row of cages wherein the heads of all sows are aligned at one end of the cages, the improvement comprising the step of placing a male hog in a moveable cart, the cart having an opening in a side wall thereof, and moving the cart along the one end of the cages while permitting the male hog to have snout to snout contact with a sow.

In a further aspect of the present invention, in a process of artificial insemination of a sow wherein a plurality of sows are each enclosed in an individual cage, the cages being aligned, and wherein the heads of all sows are aligned at one end of the cages, the improvement comprising the step of placing a male hog in a moveable cart, the cart having an opening in a side wall thereof, and moving the cart along the one end of the cages, and permitting the male hog to have snout to snout contact with the sow during the step of artificial insemination.

The cart of the present invention may take several forms. The cart may be formed as a single unitary cart of a rectangular configuration although, in a preferred embodiment the cart is formed of at least two sections which are hingedly connected together. This arrangement is advantageous for movement in close quarters wherein the hinged connections allow for moving around a corner in a very short radius.

The cart is preferably motor driven although a hand pushed cart incorporating the features of the present invention could also be employed. The cart is preferably driven by an electric motor of a suitable voltage which in turn may be powered by a suitable non-explosive rechargeable battery. Alternatively, a 120 volt AC connection could be employed. Preferably, the cart is capable of being driven in both directions and even more preferably, is capable of being remotely controlled.

One of the advantageous features of the present invention is the provision of means to prevent the animal from lying down in the cage. Such means may conveniently comprise a member extending underneath the hog to prevent such occurrences. Such a member may extend either transversely or longitudinally of the cart.

Preferably, the cart includes means for limiting the vision from one end and one side thereof. Such an arrangement is advantageous in that the animal can then only focus along a single direction. Preferably, the panels are removable and may be placed on either side/end of the cart.

Similarly, the cart is designed to permit snout to snout contact between the male hog and the sow. To do so, the space between the bars may be sufficient to permit such snout to snout contact or in a preferred embodiment, a portion of the wall is designed with removable bars such that the access opening may be enlarged or diminished as appropriate.

The cart of the present invention may be provided with sound emitting means, imitating noises, grunting or vocal noises of an animal. The sound emitting means may be remotely controlled or activated when the cart is moving depending of needs.

The cart is made of suitable materials to preferably be resistant to corrosion and to ensure proper sanitation.

One particular arrangement of the cart calls for centrally mounted wheels which permits the shortest turning radius for the cart. Preferably, such wheels are pneumatic and the air pressure may be varied depending on the load. Thus, additional support wheels placed under unmotorized sections of the cart may be provided and the pneumatic wheels would have the pressure adjusted, depending upon the load, such that the cart is level.

In the improvement in the process of determining estrus, the cart may be moved past the heads of sows which are in aligned cages. At the same time, a worker placed at the rear of the sows can maneuver the cart and using conventional techniques, determine whether the sow is entering estrus. It has been found that permitting the snout to snout contact assists in the determining of estrus.

Similarly, during the process of artificial insemination, the maneuvering of the cart to each sow which is undergoing artificial insemination to permit snout to snout contact has been found to be extremely beneficial. It has been found that in so doing, success rates in artificial insemination have been as high as 95% compared to traditional figures of 85% or less.

Therefore, in accordance with the present invention, there is provided a moveable cart suitable for transportation of animals, the moveable cart provided with wheels thereon and comprising a first end cart section and a second end cart section, said first end cart section including a first base section, a first end cart section wall extending upwardly from said first base section to define a first enclosure having an open end, said second end cart section having a second base section, a second end cart section wall extending upwardly from said second base section to define a second enclosure having one open side, means for securing said first end cart section and said end second cart section together such that open sides are in alignment and said first end cart section and said second end cart section together define an enclosed cart.

More particularly, the cart further includes means associated with one of said cart section walls for limiting visual access in at least one direction between the interior and exterior of said cart, and at least one opening in at least one of said section walls sized to permit a head of an animal to at least partially extend therethrough.

Specifically, the cart further includes at least one central cart section, said central cart section including a central base section, a central cart section wall extending upwardly from said central base section to define a central enclosure having two open ends, means for securing said central cart section with said end cart sections, or with other central cart section and an end section or with two central cart sections therebetween, such that open sides are in alignment and said first end cart section, said second end cart section and said at least one central cart section together define an enclosed cart.

Typically, said end sections each include at least one wall that comprises first and send opposed side walls and first and second opposed end walls, and means for securing said side walls and end walls together.

Also in accordance with the present invention, there is provided a process of artificial insemination for determining estrus in sows wherein a plurality of sows are each enclosed in an individual cage, said cages being aligned, where the heads of all sows are aligned at one end of said cages, the improvement comprising the step of placing a male hog in a cart, said cart being provided with wheels thereon and comprising a first end cart section and a second end cart section, said first end cart section including a first base section, a first end cart section wall extending upwardly from said first base section to define a first enclosure having an open end, said second end cart section having a second base section, a second end cart section wall extending upwardly from said second base section to define a second enclosure having one open side, means for securing said first end cart section and said end second cart section together such that open sides are in alignment and said first end cart section and said send end cart section together define an enclosed cart, and moving said cart along said one end of said cages while permitting said male hog a snout-to-snout contact with a sow.

BRIEF DESCRIPTION OF THE DRAWINGS

Having thus generally described the invention, reference will be made to the accompanying drawings illustrating an embodiment thereof, in which:

FIG. 17 illustrates a schematic top plan view of an arm that stabilizes sections of the cart of FIG. 14; and FIG. 18 illustrates a schematic top plan view of the arm of FIG. 17, but in a turning position of the cart.

DESCRIPTION OF THE PREFERRED EMBODIMENTS

Figure 1:
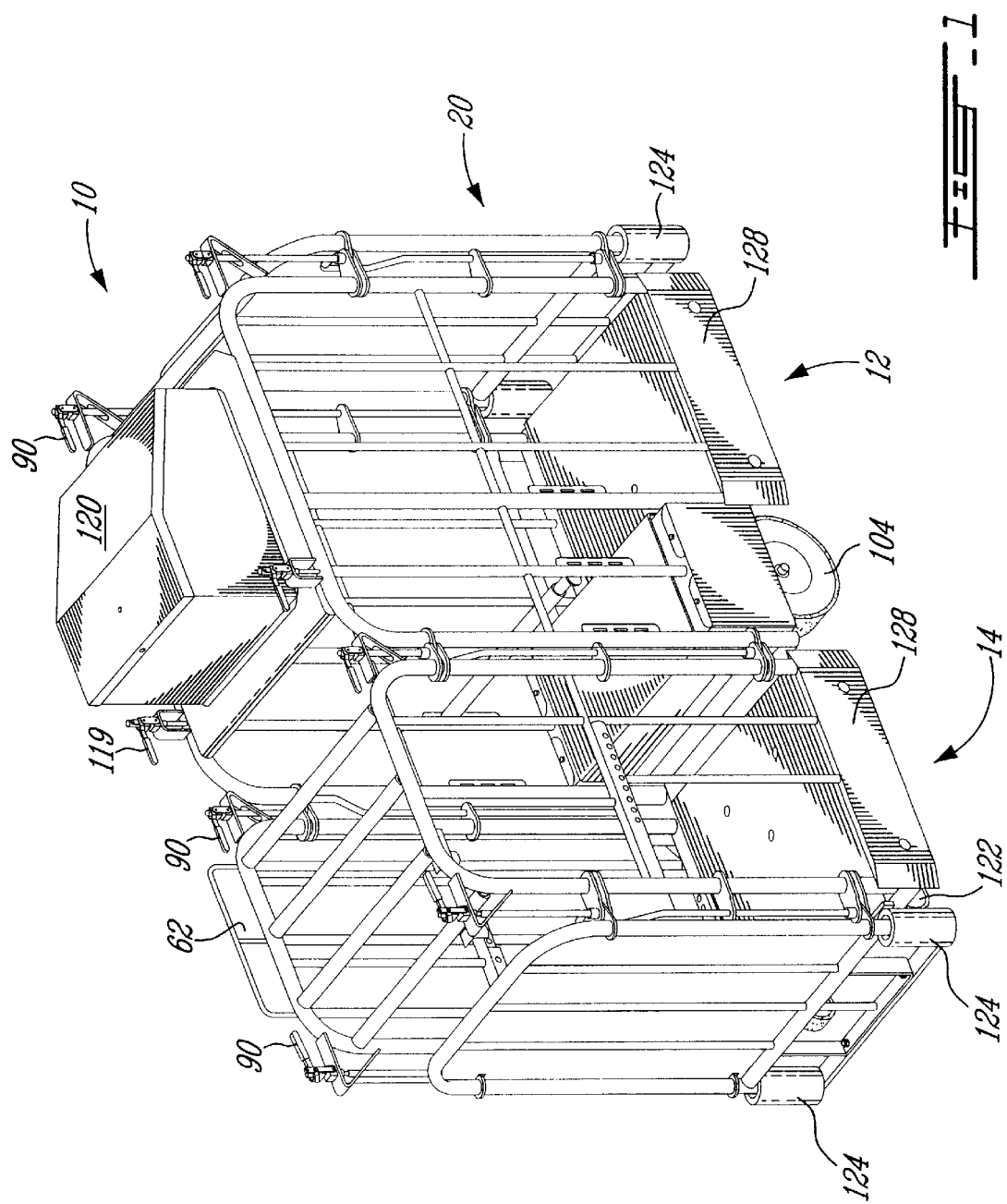
FIG. 1 illustrates a perspective view of a cart according to one embodiment of the present invention.

Referring to the drawings in greater detail and by reference characters thereto, there is illustrated in FIG. 1 a moveable cart according to the present invention and which cart is generally designated by reference numeral 10. Moveable cart 10 has a first end cart section generally designated by reference numeral 12 and a second end cart section generally designated by reference numeral 14.

First end cart section 12 includes a first side wall 16 and an opposed side wall 18 with an end wall/door 20 located therebetween at one end. Thus, as may be best seen in FIG. 6, there is provided a first cart section 12 which has an open end opposed to end wall/door 20.

Side walls 16 and 18 are similar and thus only will be described in detail herein, with similar reference numerals with a prime being used for similar components on side wall 18. Side wall 16 includes an upper frame member 22 which is connected to side frame members 24 and 26. Intermediate side fame members 24 and 26 are a plurality of vertical bars 28 while a horizontal bar 30 extends between side frame members 24 and 26.

Figure 3:
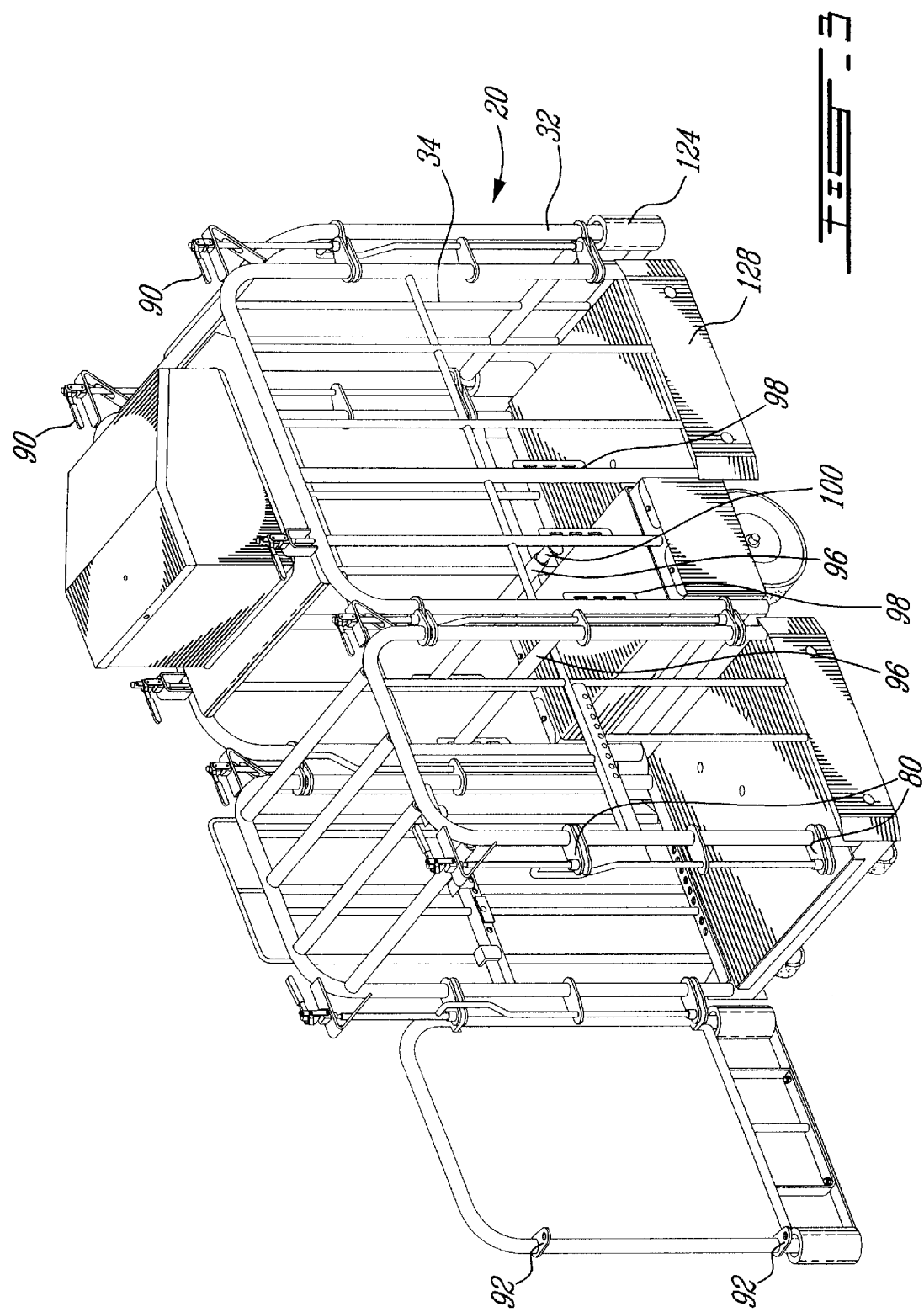
FIG. 3 illustrates a perspective view, similar to FIG. 1, illustrating a cart with one of the end doors in an open position.
Figure 4:
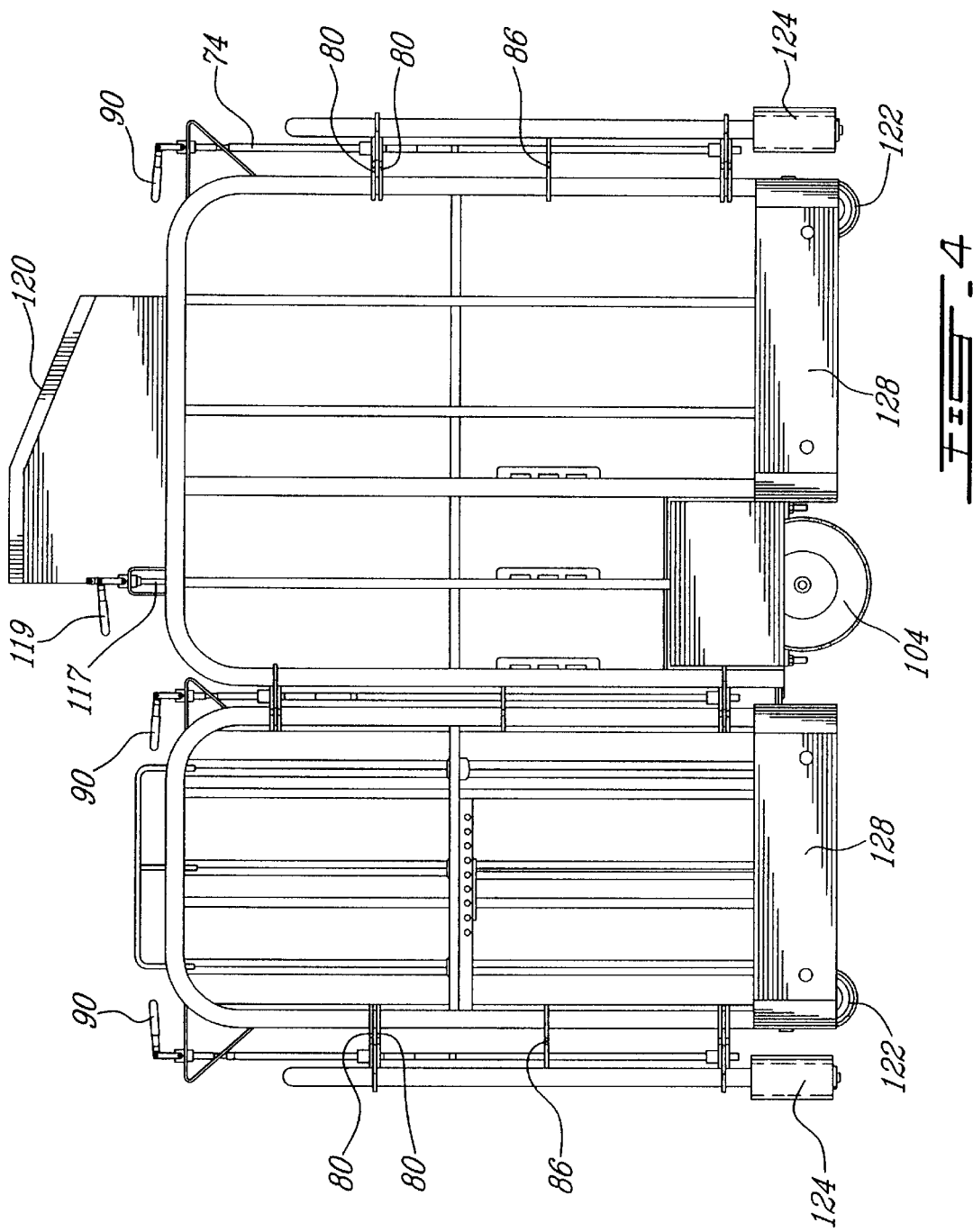
FIG. 4 illustrates a side elevational view of the cart of FIG. 1.

End door 20, as may be best seen in FIG. 3, includes a U-shaped frame 32 having a plurality of vertical bars 34 extending between the side frame portions thereof.

Figure 14:
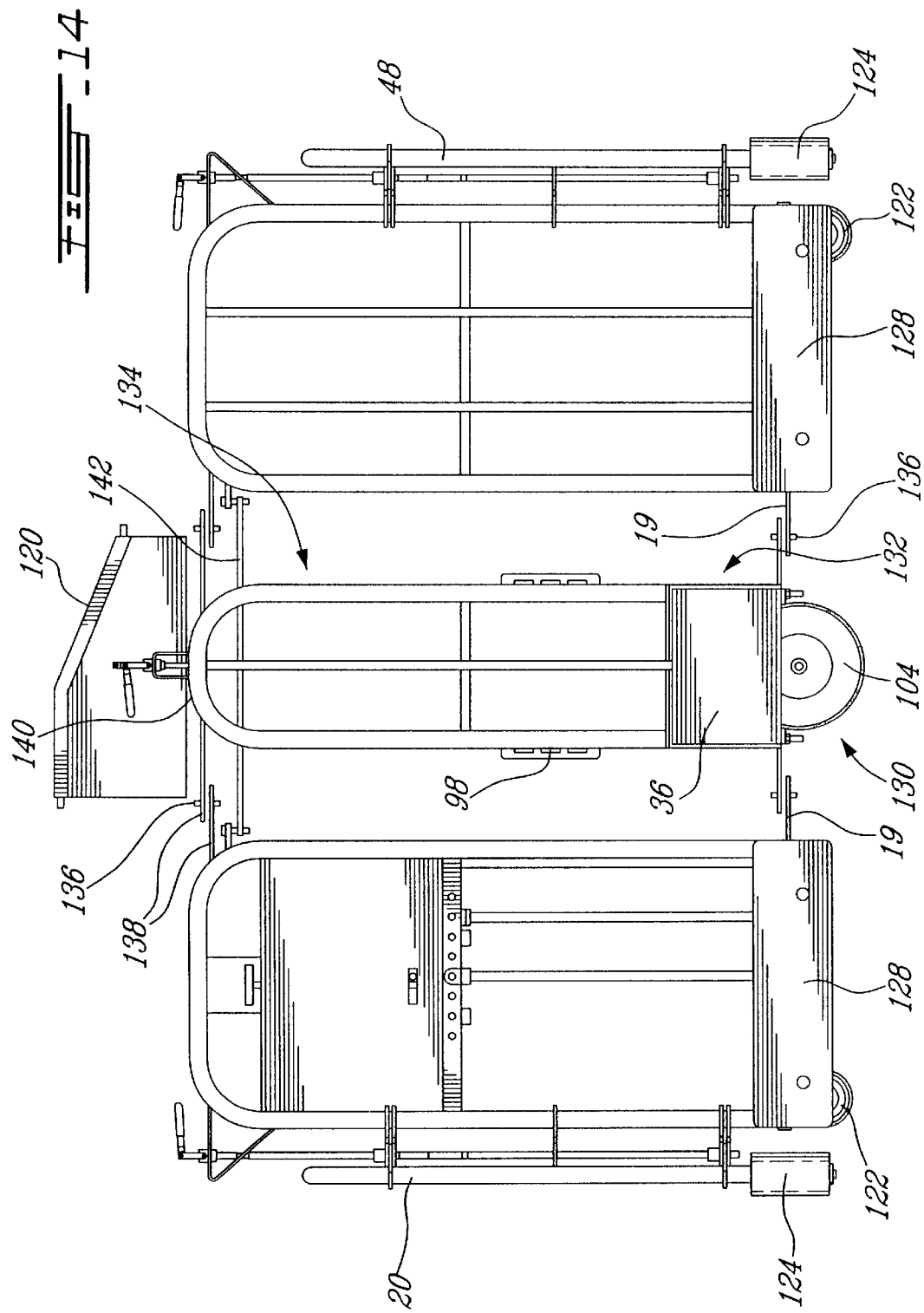
FIG. 14 illustrates a side elevation view according to another embodiment of the present invention showing a cart comprising more than two sections.
Figure 15:
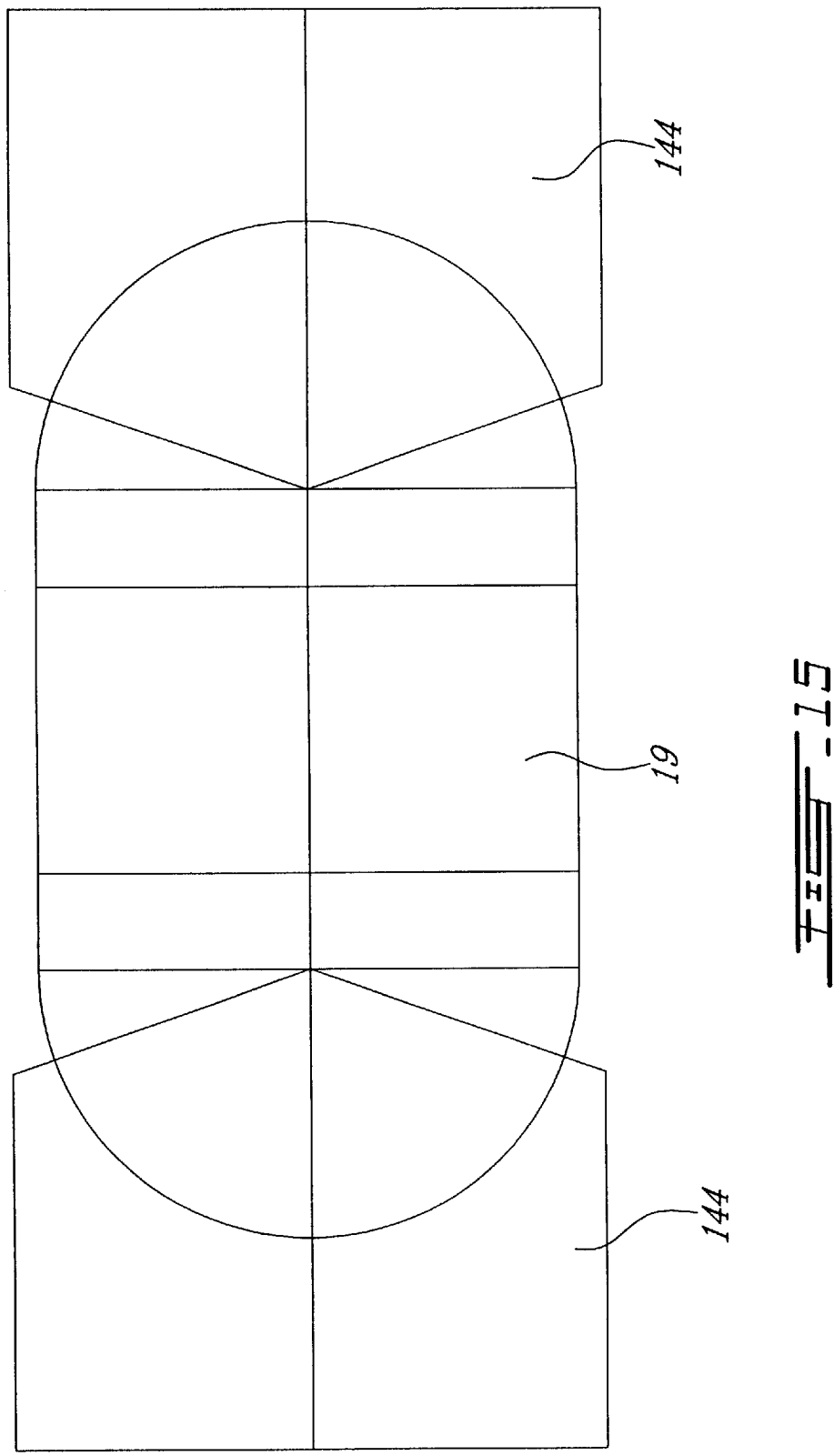
FIG. 15 illustrates a schematic top plan view of an alternative means for securing sections of the cart of FIG. 1 or FIG. 14.
Figure 16:
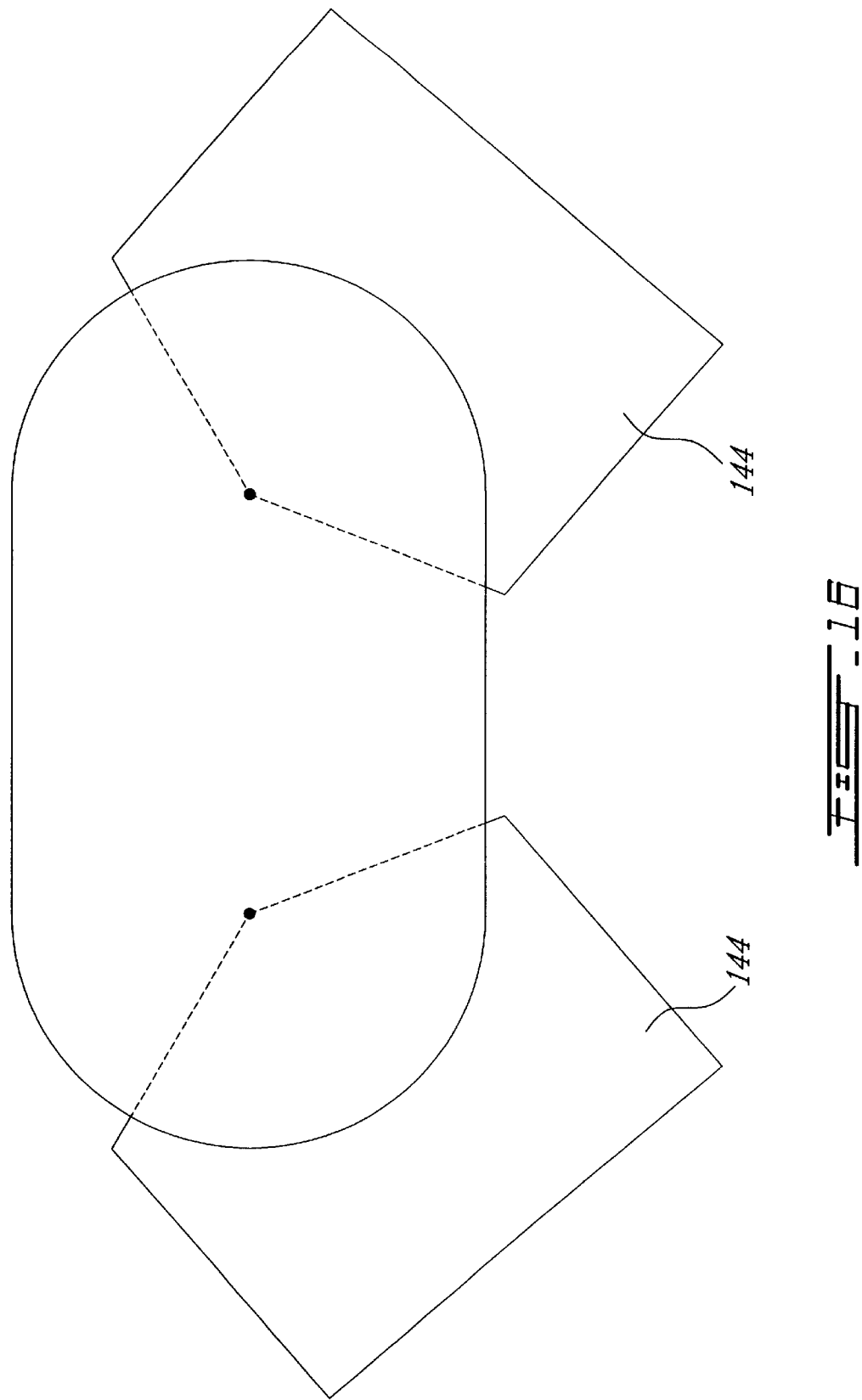
FIG. 16 illustrates a schematic top plan view of the alternative securing means of FIG. 15 but in a turning position of the cart.

Forming a portion of first end cart section 12 is a drive compartment generally designated by reference numeral 36 and which will be described in greater detail hereinbelow. The drive compartment 36 may be placed aternatively under any section of the cart. It may be placed under an end section as well as under a central section (as seen in FIG. 14).

Figure 5:
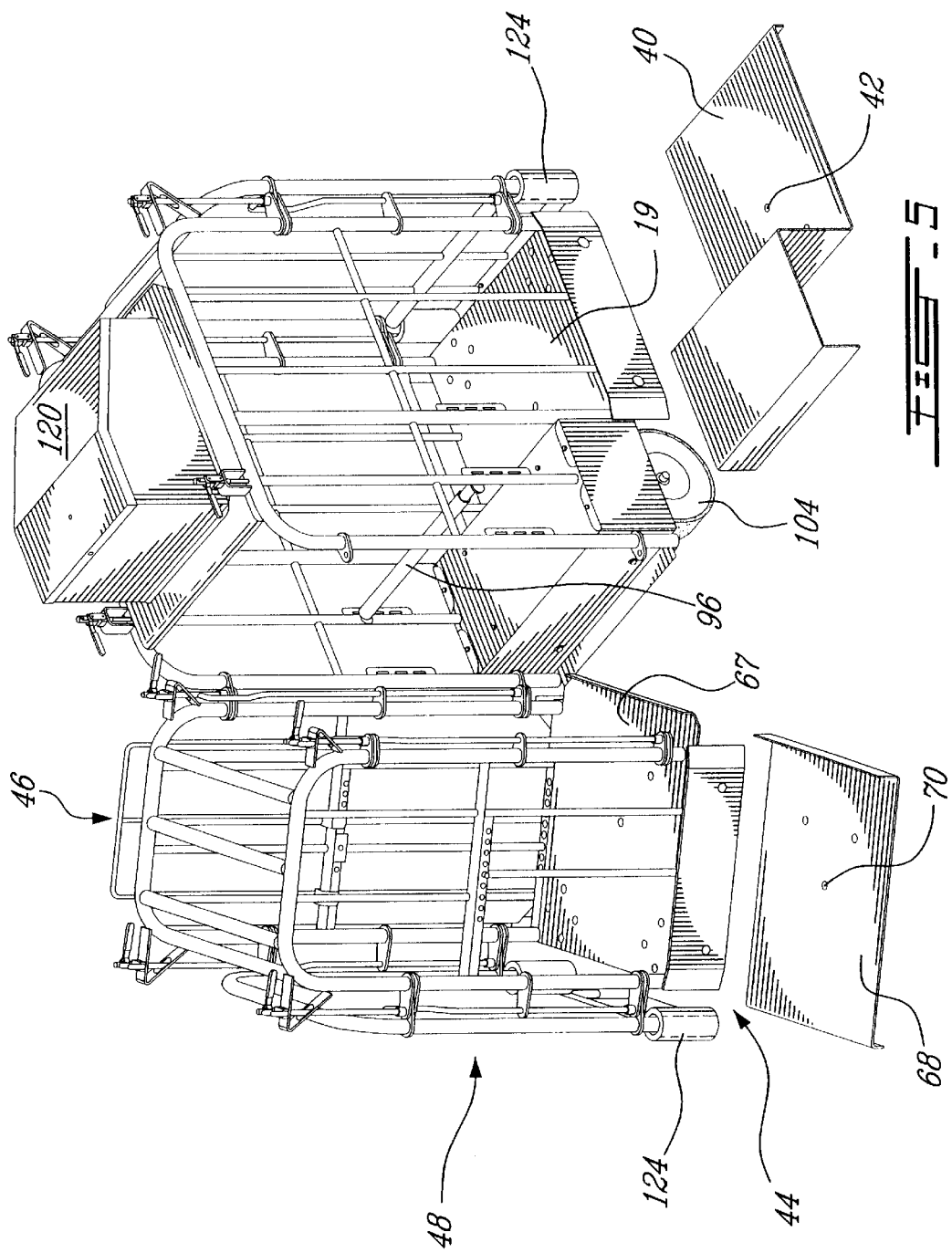
FIG. 5 illustrates a perspective view of the cart of FIG. 1 in a partially open configuration for negotiating tight spaces and also showing the removable floor pans.

As may be best seen in FIG. 5, first cart section 12 includes a sub-floor 19 which is preferably of a stainless steel with a final finished floor 40 superimposed thereon. Floor 40 is preferably of a relatively thick aluminum and is formed to be anti-slip and assure the comfort of the animal within. Drainage apertures 42 are provided in sub-floors 19 and finished floor 40.

As shown in FIG. 5, the second end cart section 14 includes a first side wall 44 and opposed side wall 46 with an end wall/door 48 therebetween to thereby define an open ended cage section.

The cart may have more than two sections. As shown in FIG. 14, at least one additional central section 130 is interposed between first and end cart sections 12 and 14, the central section 130 including a first wall 132 and opposed side wall 134 with two open ended cage sections. The central cart section 130 includes a sub-floor 19 which may be covered with a final finished floor superimposed thereon.

Figure 6:
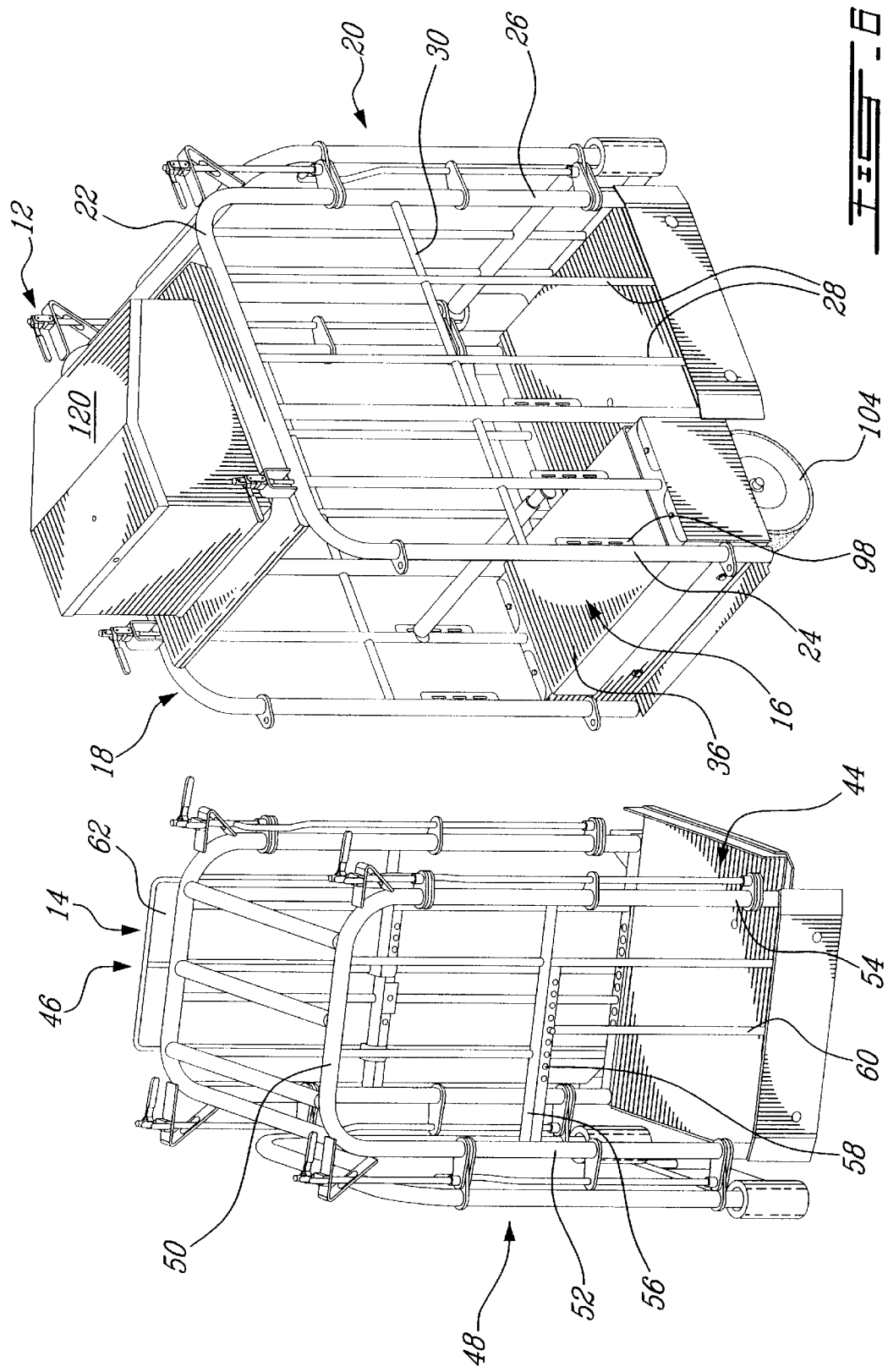
FIG. 6 illustrates a perspective view similar to FIG. 5 showing a section of the cart detached from the main portion thereof.
Figure 7:
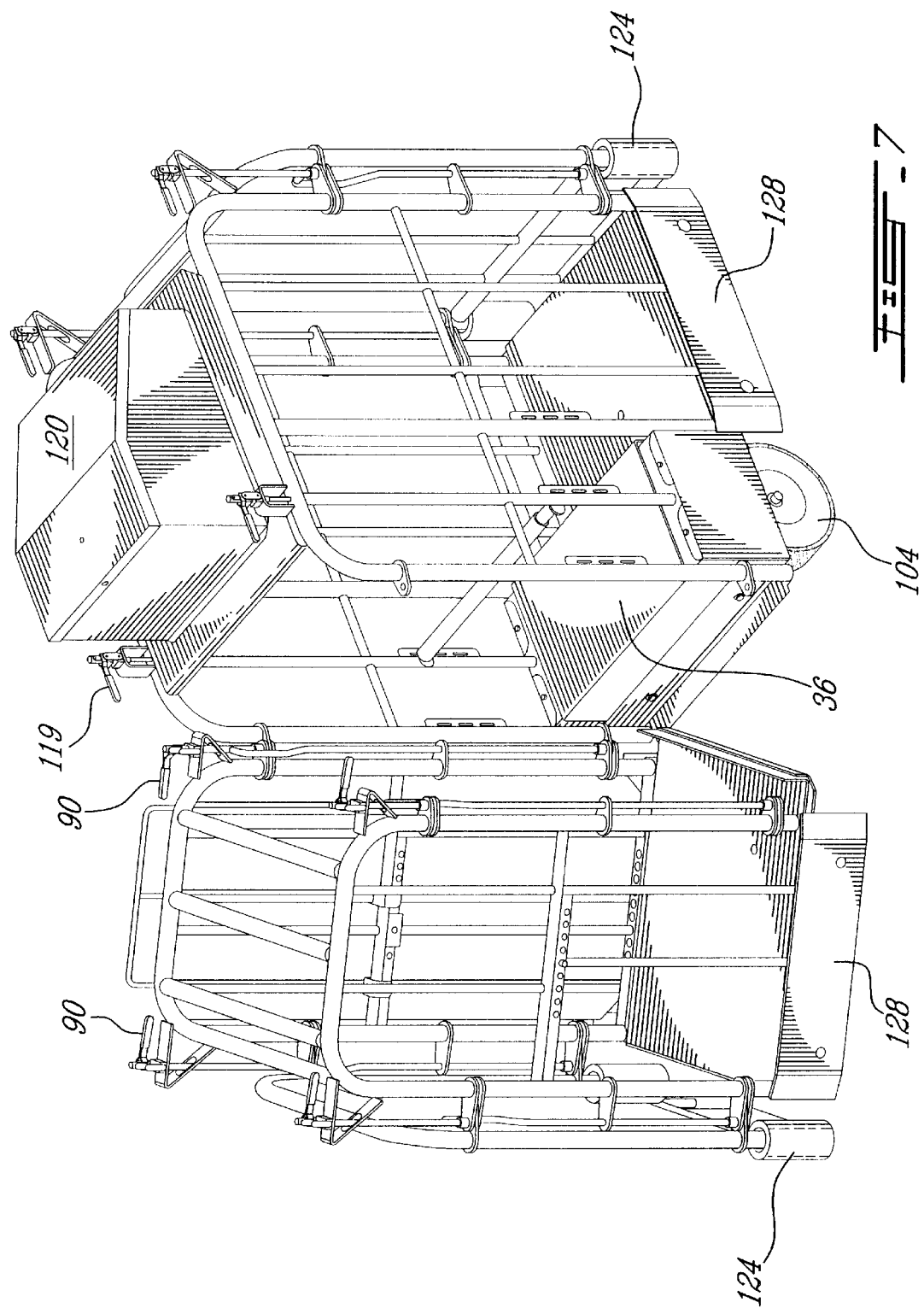
FIG. 7 illustrates a perspective view of the cart of FIG. 1 in a partially open position.

Side wall 44 and side wall 46 are similar and thus only one will be described in detail herein. Side wall 44, as seen in FIG. 6, includes an upper horizontal frame member 50 from which extend downwardly side frame member 52 and 54. A horizontal frame member 56 extends between side frame members 52 and 54 with a plurality of apertures 68 being formed therein as well as in the bottom horizontal frame member. A plurality of vertical bars 60 are fitted within apertures 58 and may be inserted/removed as required to provide an adjustably sized access opening to the second cart section 14.

Figure 2:
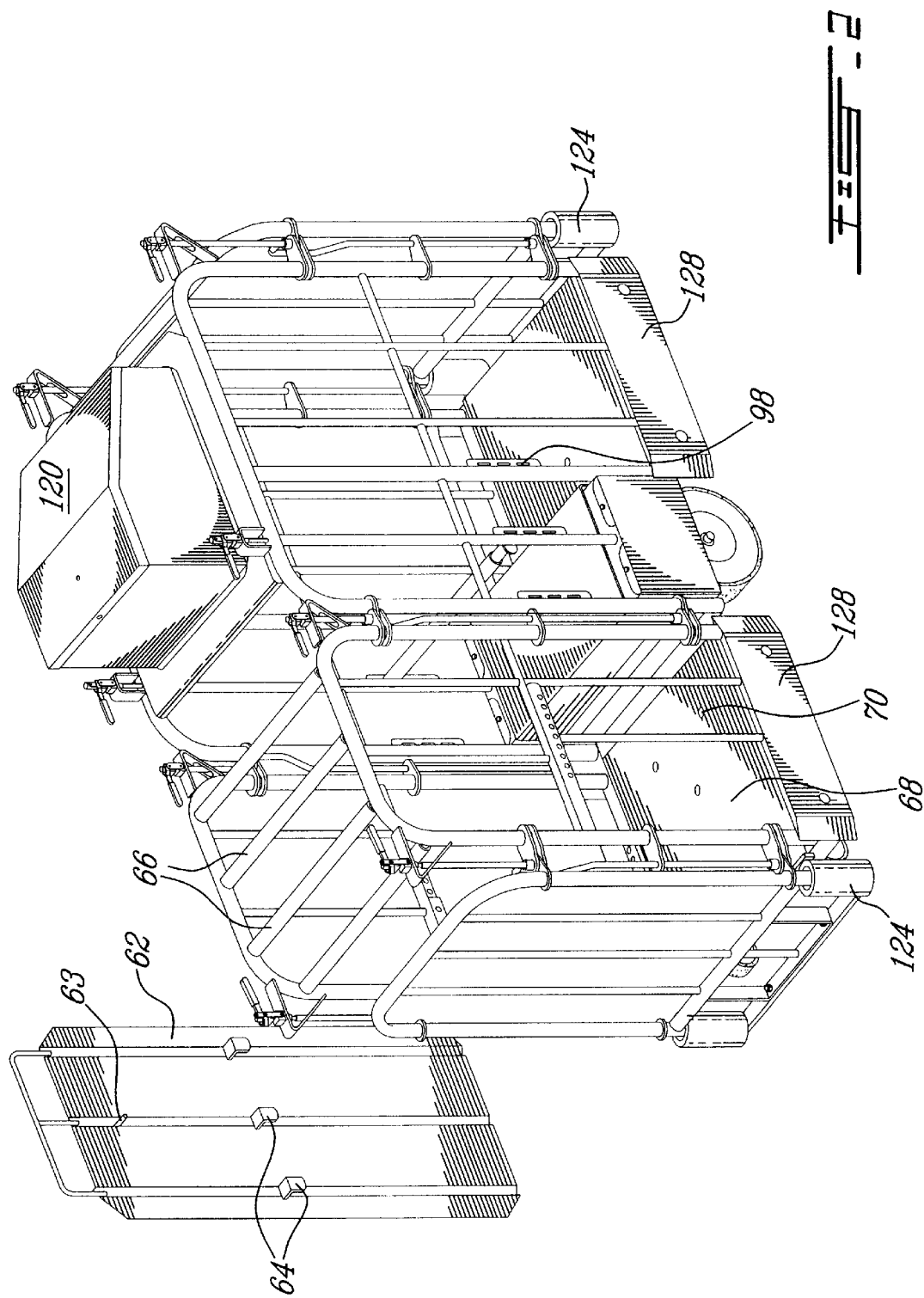
FIG. 2 illustrates a perspective view similar to FIG. 1 illustrating the attachment of a side panel to a portion of the cart.

Opaque panels such as shown in FIGS. 2, 5 and 6 may be utilized to prevent visual access from within the cart. Panels 62 may include a plurality of L-shaped hooked members 64 for securing the same to horizontal bar 56 as well as a looking pin 63 (FIG. 2). Second cage section 14 also includes a plurality of ceiling frame members 66. In a manner similar to that described with respect to first cart section 12, there is provided a stainless steel sub-floor 67 and a finished aluminum floor 68, each having drainage apertures 70 formed therein.

There are provided attachment means which are generally designated by reference numeral 72 and which are utilized for joining the various cart sections together and also for securing the end wall/doors 20 and 48. This mechanism may best be seen in FIGS. 3 and 13 and reference will now be made thereto.

Figure 13:
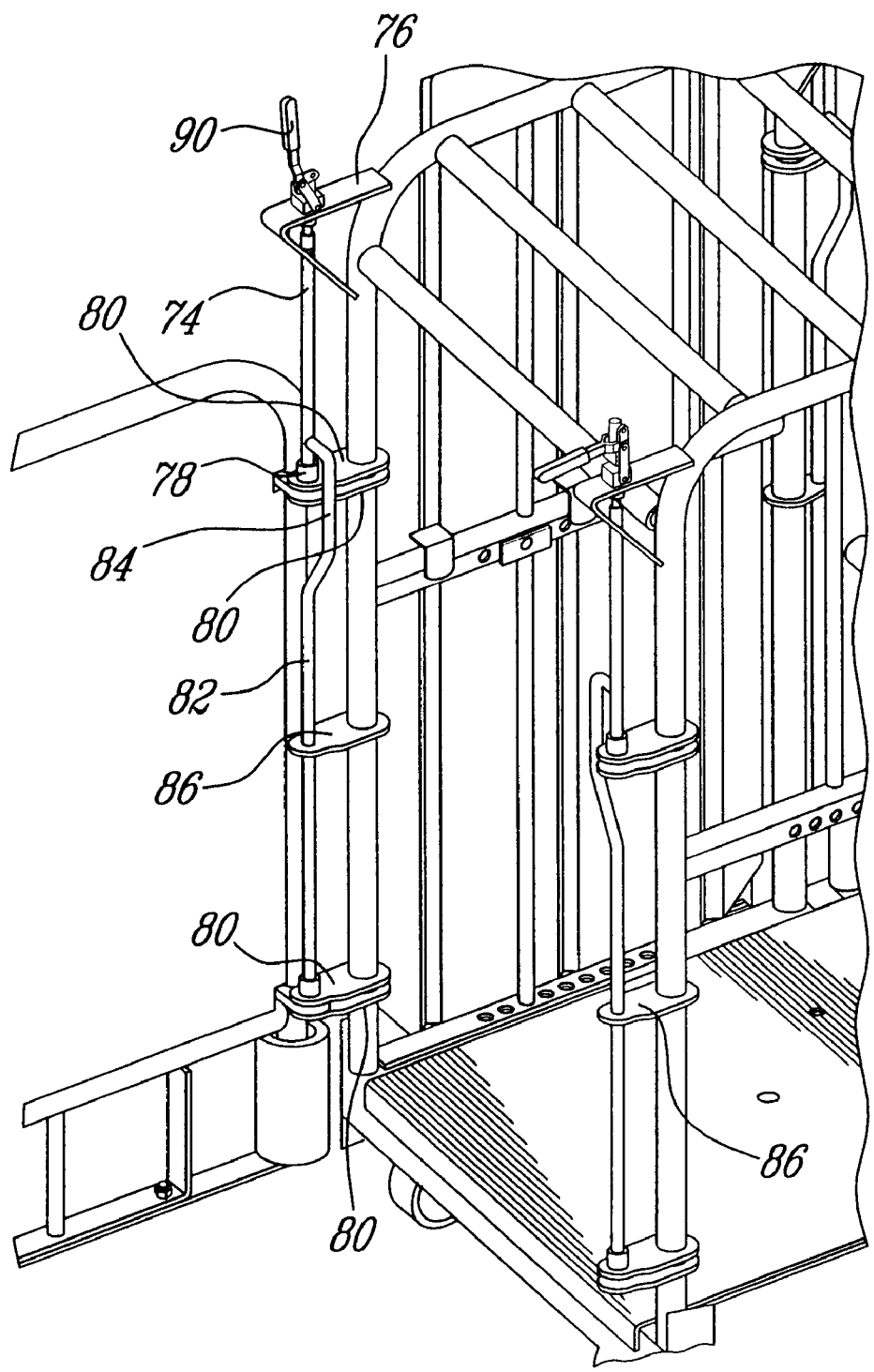
FIG. 13 illustrates a partial perspective view showing in detail the means for connecting sections of the cart together and door latching mechanisms.

Attachment means 72 includes an upper rod section 74 which is mounted to a V-shaped support 76 suitably secured to a frame member as required. Extending outwardly from the vertical frame members are a pair of flanges 80 which are slightly spaced apart. A pair of lower flanges are also provided (FIG. 13). Sleeve inserts 78 may be provided therein.

A lower vertical rod section 82 is connected to upper rod section 74 by a connecting section 84. There is also provided an intermediate support flange 86.

Mounted on the vertical frame of the portion to be joined are a pair of flanges or plates 92 which are designed to fit within the space between flanges 80. Rod sections 74 and 82 may then be operated to fit within aperture flanges 80 and plate 92 to retain the two assembled together in a pivotable manner. An upper lever 90 may be used to move the rod sections 74 and 82 as required.

The same mechanism is provided at the corners where end cart sections are to be joined as well as where end wall/doors 20 and 48 are secured. With this arrangement, the doors and sections may be either pivoted with respect to one another and/or completely removed as shown in the different configurations in the drawings.

Alternative attachment means between cart sections can be seen in FIGS. 14 to 18. End and central cart sections may be attached together with members placed at the base of each section and retained together with a pivoting means 136. Section floors 19 with protruding extensions thereof may constitute such members. Attachment members may include members placed on the top of sections and which may be fixed on upper frame members 22, 50 or 140 and retained together with a pivoting means 136. A stabilizing means 142, such as a rod arm, may be fixed at its ends to two sections.

Figure 8:
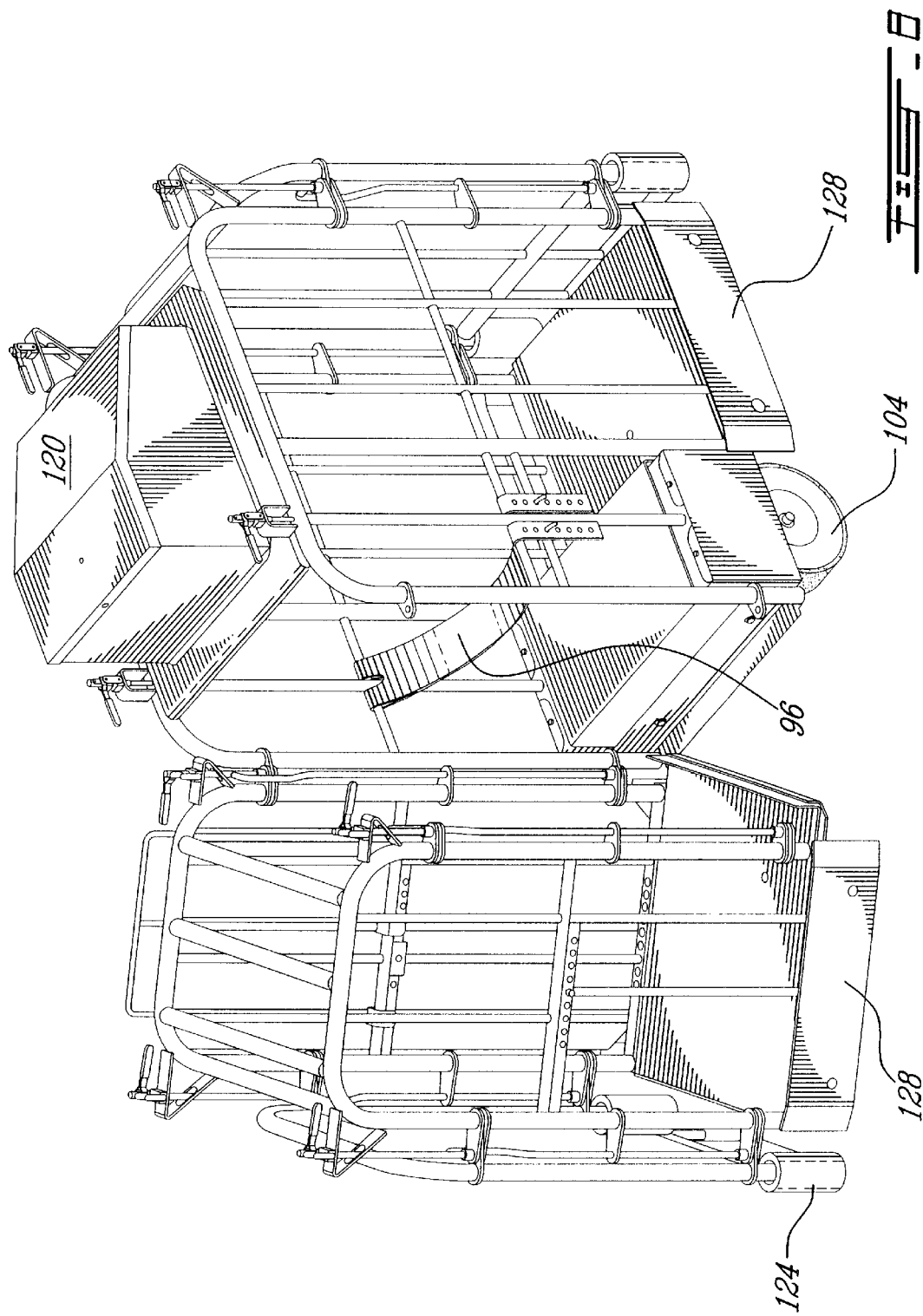
FIG. 8 illustrates a perspective view similar to FIG. 7, but showing an alternative restraining component within the cage.
Figure 9:
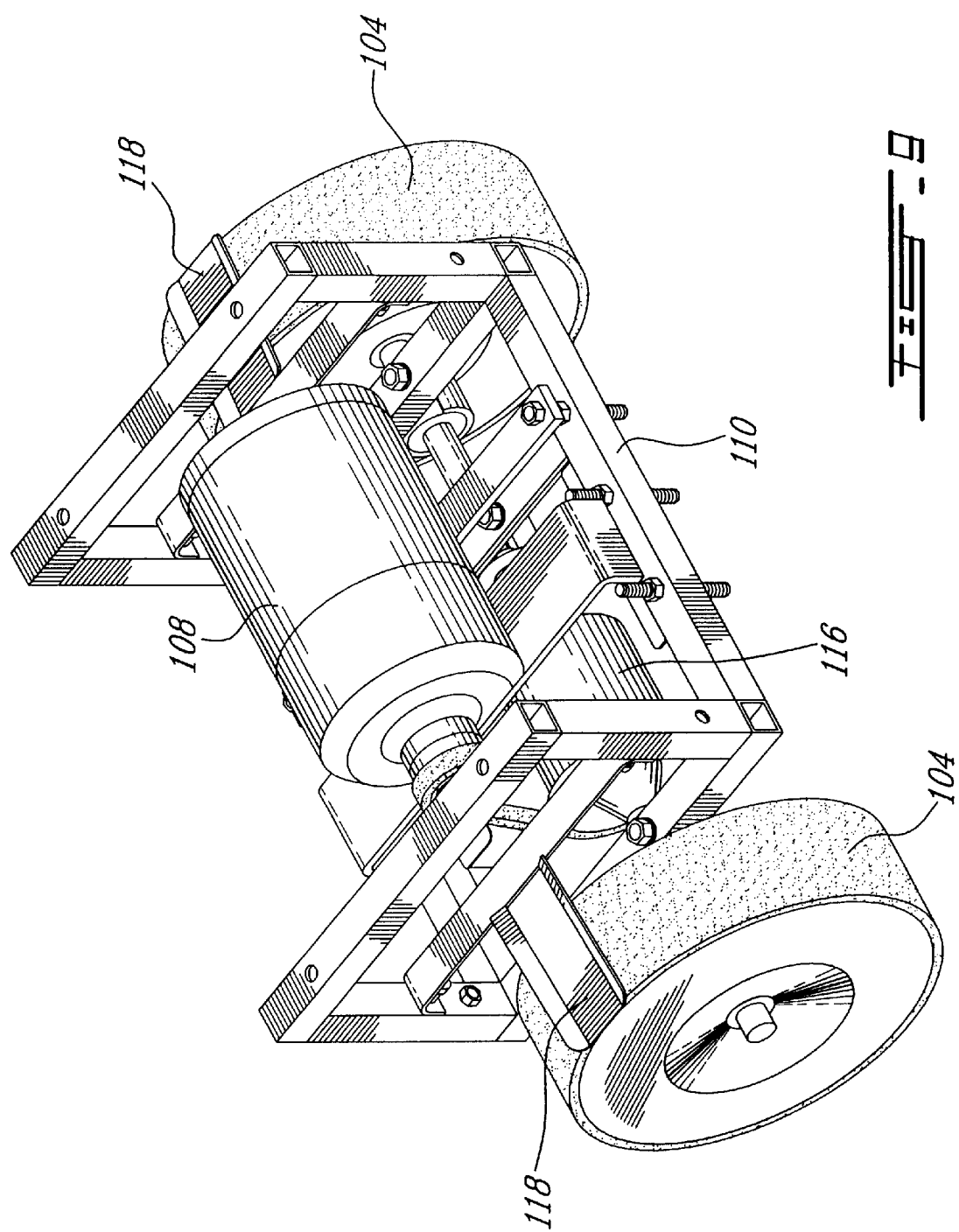
FIG. 9 illustrates a partial perspective view, with portions removed, of a drive unit of the cart of FIG. 1.
Figure 10:
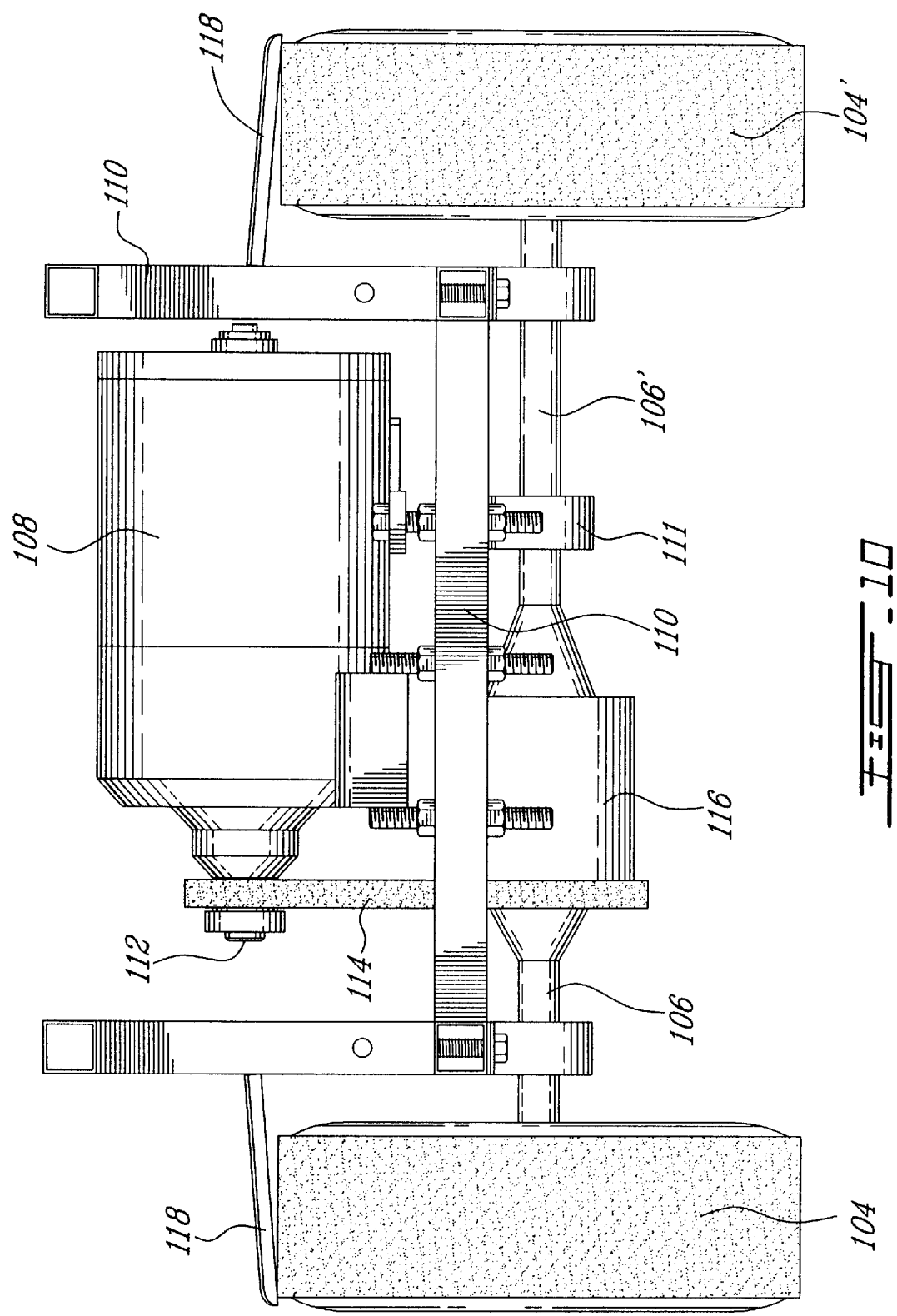
FIG. 10 illustrates side elevational view of the drive unit illustrated in FIG. 9.
Figure 11:
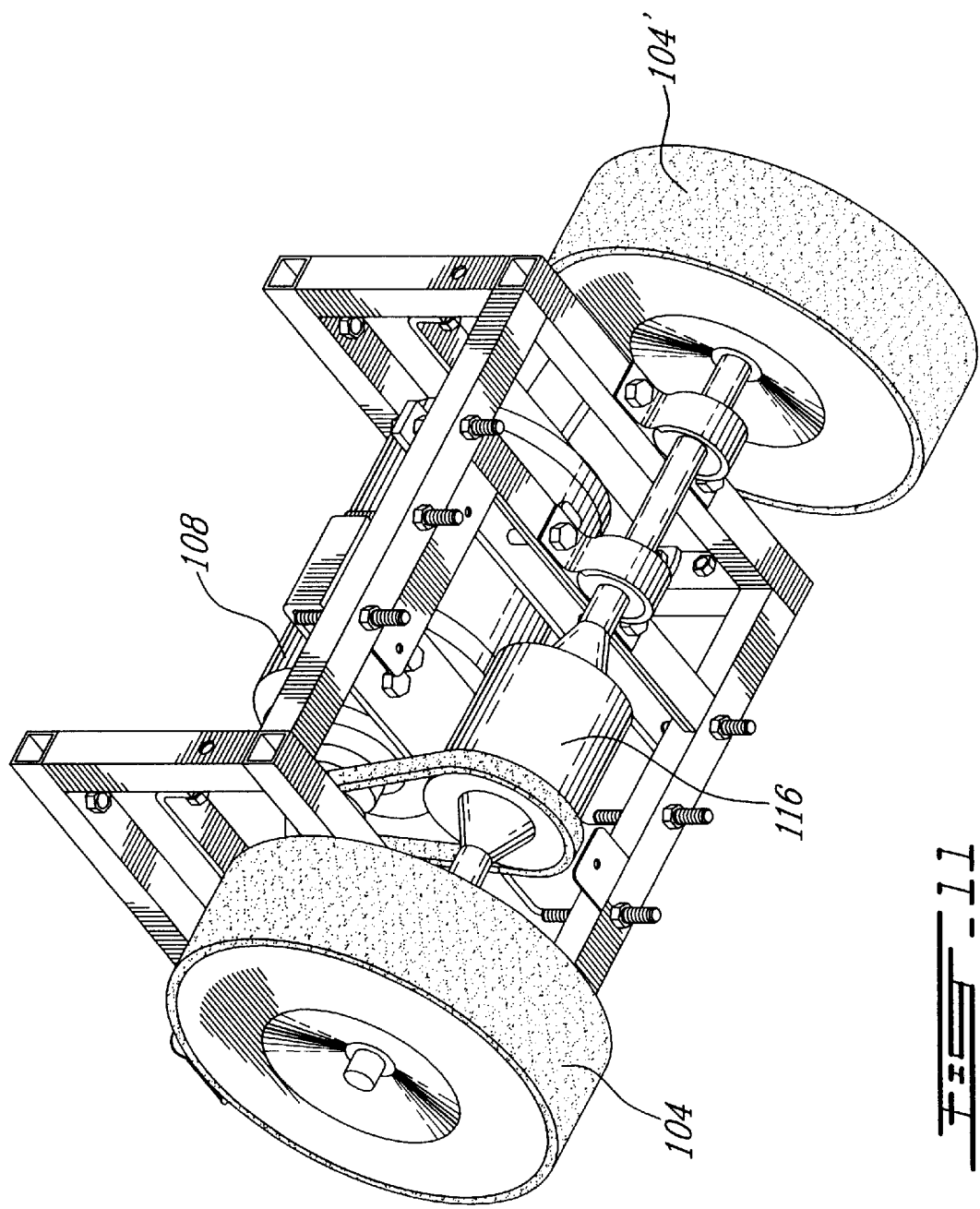
FIG. 11 illustrates a bottom perspective view of the drive unit and components thereof.
Figure 12:
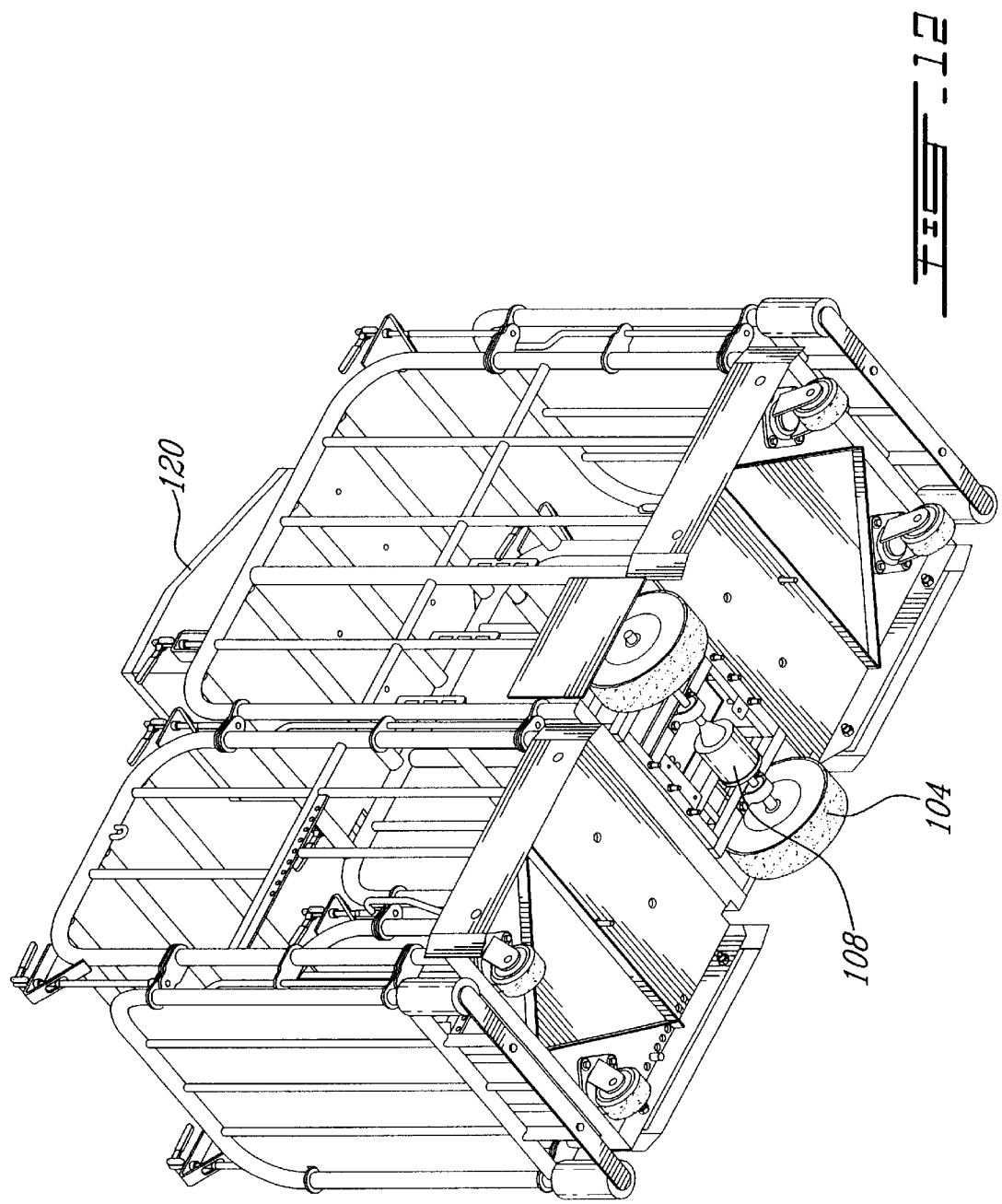
FIG. 12 illustrates a bottom perspective view of the cart of FIG. 1.

Within the cart sections, there may be provided a pair of animal positioning members generally designated by reference numeral 96, such as in first cart section 12 in FIGS. 3, 5 and 8, and which each comprise a bar designed to extend across between side walls, e.g. side walls 16 and 18. Retaining members 98 (see FIG. 6) are mounted on the vertical bars 28 and provide for variable location of the hog positioning members 96. In this respect, hog positioning members 96 may utilize a spring loaded telescoping inner bar 100 (see FIG. 3) in a known manner. The positioning member 96 may also include a bar that extends longitudinally centrally in the car section, such as in the end cart sections, fixed at its extremities to bars 34, and at a height of 12 inches, perhaps along ¾ of the length of the cart section. The positioning member seen in FIG. 8 may be also attached at each extremity to upper frame members of any section.

Mounted below drive compartment 36 is a pair of wheels, 104, 104' mounted on axles 106, 106' respectively. An electric motor 108 is mounted on a suitable support frame 110. Axle 106 may carry a ball bearing support for 111 for support axle 106'. Wheels 104 and 104' are preferably pneumatic and the pressure therein may be adjusted according to the weight of the cart and contents.

Electrical motor 108 is designed to drive a pulley 112 having a belt 114 entrained thereabout and which is operatively connected to a differential 116.

For braking purposes and also for turning/there are provided a pair of braking members 118 which may be selectively operated on either one of the wheels to provide for a turning capability or on both wheels. Braking members 118 are connected to rods 117, which extend upwardly to handles 119 for activation. Thus, the braking of one of the wheels will provide a turning moment about that wheel to therefore provide for maximum manoeuverability.

Mounted on top of the cart sections is housing 120 which may be utilized to house the various controls. In this respect, a suitable remote control utilizing known circuitry preferably drives the cart. Also preferably provided are speakers which may be housed within the housing 120. Speakers may be continuously emitting sounds, or activated by remote control. A sound may be emitted to imitate hog grunting or the noise an animal makes. Another embodiment of the present invention is that animals of different species can be transported with the cart of the invention. Among these animals there can be considered canine, porcine, ovine, caprine, equine, ungulates, and feline.

For ease of movement, the cart is provided with support wheels 122 that may be situated at the comers of the end cart sections (e.g. cart sections 12 and 14), or under any central cart section.

There are also provided bumper rollers 124 at respective corners of the cart 10. In addition, there are provided abutment plates 128 situated at the lower portions of each side of first cart section 12 and second cart section 14. Abutment plates 128 are adapted to contact edges of the path followed by cart 10—i.e. the cart, particularly when it is being driven by means of the remote control, may utilize the abutment plates as the cart moves along the edge of the various cages.

Electric motor 180 is preferably a DC motor and powered by a rechargeable non-explosive battery. The control system may include a safety system such that upon a predetermined resistance, the drive is cut off. This would prevent any accidental crushing of any object in the path of the cart. As will be appreciated, in any building wherein several such cats may be utilized, each cart would operate on a different frequency for the remote control.

The remote control cart is highly suitable for practice of the method of the present invention. For example, a single worker will be located preferably at the rear of the individual cages for the sows and able to remotely control the cart transporting a hog as it moves from cage to cage for purposes of both determining estrus and for purposes of artificial insemination.

It will be understood that the above described embodiments is for purpose of illustration only and that changes or modifications may be made thereto without departing from the spirit and scope of the invention.

We claim:

1. In a process of artificial insemination for determining estrus in sows wherein a plurality of sows are each enclosed in an individual cage, said cages being aligned, where the heads of all sows are aligned at one end of said cages, the improvement comprising the step of placing a male hog in a cart, said cart being provided with wheels thereon and comprising a first end cat section and a second end cart section, said fist end cart section including a first base section, a first end cart section wall extending upwardly from said first base section to define a first enclosure having an open end, said second end cart section having a second base section, a second end cart section wall extending upwardly from said second base section to define a second enclosure having one open side, means for securing said first end cart section and said end second cart section together such that open sides are in alignment and said first end cart section and said second end cart section together define an enclosed cart, and moving said cart long said one end of said cages while permitting said male hog a snout-to-snout contact with a sow.

2. The process of claim 1, further including means associated with one of said cart section walls for limiting visual access in at least one direction between the interior and exterior of said cart, and at least one opening in at least one of said section walls sized to permit a head of an animal to at least partially extend therethrough.

3. The process of claim 2, further including at east one central cart section, said central cart section including a central base section, a central cart section wall extending upwardly from said central base section to define a central enclosure having two open ends, means for securing said central cart with said end cart sections, or with other central cart section and an end section or with two central cart sections the between, such that open sides are in alignment and said first end cart section, said second end cart section and said at least one central cart section together define an enclosed cart.

4. The process of claim 3 wherein said end sections each include at least one wall that comprises first and second opposed side walls and first and second opposed end walls, and means for securing said side walls and end walls together.

5. The process of claim 4 wherein each of said first and second end walls is hingedly connected to an adjacent side wall.

6. The process of claim 5 wherein each of said walls comprises of a plurality of spaced apart bars.

7. The process of claim 4 wherein said means for limiting visual access comprises at least one panel of an opaque material, and means for attaching said panel to said at least one wall.

8. The process of claim 2 further including means for adjusting the size of said at least one opening in said at least one side wall.

9. The process of claim 8 wherein said means for adjusting the size of said at least one opening comprises a plurality of removable bars mounted proximate said base.

10. The process of claim 1 further including drive means for moving said cart from one location to a second location.

11. The process of claim 10 further including remote control means operatively associated with said drive means.

12. The process of claim 1 wherein said wheels comprise first and second pneumatic tires mounted under at last one said cart section.

13. The process of claim 1, further including animal positioning means.

14. The process of claim 1 wherein said sections are hingedly secured together.

15. The process of claim 1, further including sound emitting means on said cart.

16. The process of claim 15 wherein said sound emitting means emit animal noises, grunting, and/or vocal noises.

17. The process of claim 15 wherein said sound emitting means emit sound permanently, when said cart is moving, or after activation with a remote control.

18. A moveable cart suitable for transportation of animals, the moveable cart provided with wheels thereon and comprising a first end cart section and a second end cart section, said first end cart section including a first base section, a first end cart section wall extending upwardly from said first base section to define a first enclosure having an open end, said second end cart section having a second base section, a second end cart section wall extending upwardly from said second base section to define a second enclosure having one open side, means for securing said first end cart section and said end second cart section together such that open sides are in alignment and said first end cart section and said second end cart section together define an enclosed cart, at least one central cart section, said central cart section including a central base section, a central cart section wall extending upwardly from said central base section to define a central enclosure having two open ends, means for securing said central cart section with said end cart sections, or with other central cart section and an end section or with two central cart sections therebetween, such that open sides are in alignment and said first end cart section, said second end cart section and said at least one central cart section together define an enclosed cart.

19. The cart of claim 18, further including means associated with one of said cart section walls for limiting visual access in at least one direction between the interior and exterior of said cart, and at least one opening in at least one of said section walls sized to permit a head of an animal to at least partially extend therethrough.

20. The cart claim 19 wherein said end sections each include at least one wall that comprises first and second opposed side walls and first and second opposed end walls, and means for securing said side walls and end walls together.

21. The cart of claim 20 wherein each of said first and second end walls is hingedly connected to an adjacent side wall.

22. The cart of claim 21 wherein each of said walls comprises of a plurality of spaced apart bars.

23. The cart of claim 20 wherein said means for limiting visual access comprises at least one panel of an opaque material, and means for attaching said panel to said at least one wall.

24. The cart of claim 19, further including means for adjusting the size of said at least one opening in said at least one side wall.

25. The cart of claim 24 wherein said means for adjusting the size of said at least one opening comprises a plurality of removable bars mounted proximate said base.

26. The cart of claim 18, further including drive means for moving said cart from one location to a second location.

27. The cart of claim 26, further including remote control means operatively associated with said drive means.

28. The cart of claim 18 wherein said wheels comprise first and second pneumatic tires mounted under at least one said cart section.

29. The cart of claim 18, further including animal positioning means.

30. The cart of claim 18 wherein said sections are hingedly connected together.

31. A moveable cart suitable for transportation of animals, the moveable cart provided with wheels thereon and comprising a first end cart section and a second end cart section, said first end cart section including a first base section, a first end cart section wall extending upwardly from said first base section to define a first enclosure having an open end, said second end cart section having a second base section, a second end cart section wall extending upwardly from said second base section to define a second enclosure having one open side, means for securing said first end cart section and said end second cart section together such that open sides are in alignment and said first end cart section and said second end cart section together define an enclosed cart, and further including sound emitting means on said cart.

32. The cart of claim 31 wherein said sound emitting means emit animal noises, grunting, and/or vocal noises.

33. The cart of claim 31 wherein said sound emitting means emit sound permanently, when said cart is moving, or activated when needed with a remote control.

34. A moveable cart suitable for transportation of animals, the moveable cart provided with wheels thereon and comprising a first end cart section and a second end cart section, said first end cart section including a first base section, a first end cart section wall extending upwardly from said first base section to define a first enclosure having an open end, said second end cart section having a second base section, a second end cart section wall extending upwardly from said second base section to define a second enclosure having one open side, means for securing said first end cart section and said end second cart section together such that open sides are in alignment and said first end cart section and said second end cart section together define an enclosed cart, and further including guide means comprising rotatable means mounted on a side of said cart to grade said cart along.

\* \* \* \* \*